May 18, 1926.
W. B. MILNER
ROTARY VALVE
Filed July 8, 1925
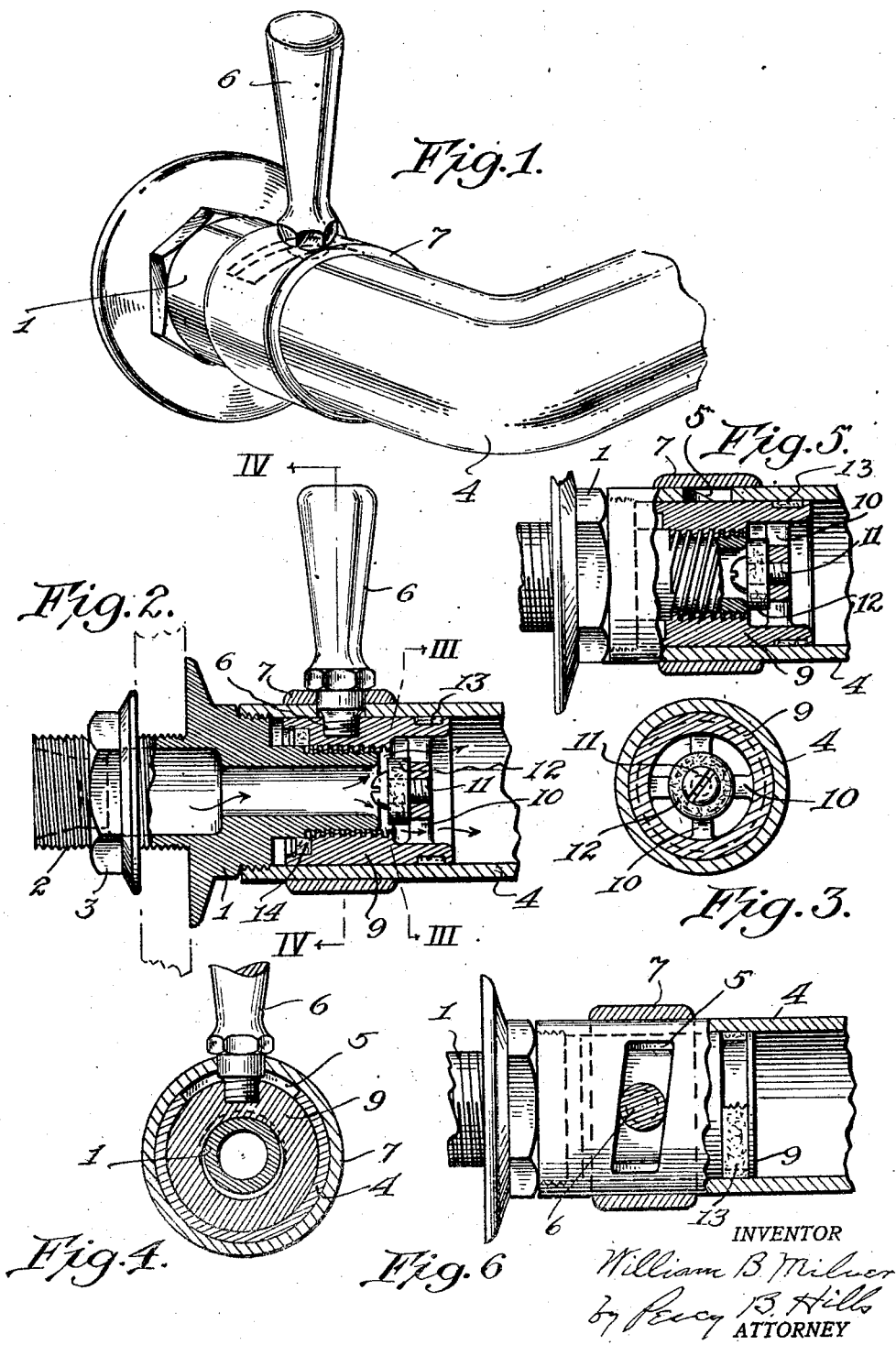

Patented May 18, 1926.

1,585,163

UNITED STATES PATENT OFFICE.

WILLIAM B. MILNER, OF DUNKIRK, NEW YORK.

ROTARY VALVE.

Application filed July 8, 1925. Serial No. 42,167.

My invention relates to rotary valves, particularly adapted for use in connection with bath and sink cocks, and has for its objects to provide a construction wherein the valve will be opened fully by a very slight movement of the handle, and will be of such a construction that all water-hammering in the pipes will be avoided.

These objects I accomplish in the manner and by the means hereinafter described and claimed, reference being had to the accompanying drawing, in which:—

Figure 1 is a perspective view of my improved valve shown applied to one of the pipes of a combined hot and cold water faucet.

Figure 2 is a vertical longitudinal sectional view taken through the same.

Figure 3 is a transverse sectional view taken on the line III—III of Figure 2.

Figure 4 is a similar view taken on the line IV—IV of Figure 2.

Figure 5 is a view partly in elevation and partly in section of the valve construction.

Figure 6 is a view similar to Figure 5 showing the parts in section in a different position.

Similar numerals of reference denote corresponding parts in the several views.

In the said drawing the reference numeral 1 denotes the valve body 1, the same being formed with a stem 2 at its outer end to receive a nut 3, whereby to clamp the same in position in a wall or partition, shown in dotted outline in Figure 2. Screw-threaded onto said valve body is a delivery pipe 4 leading to the faucet, said pipe being provided with a diagonal slot 5 adapted to receive the operating handle 6 of the valve. A collar 7 carried by said handle is mounted rotatably upon the pipe 4, the same being of a width to conceal the slot 5 in any position of adjustment of said handle. The inner end of said handle is screw-threaded to engage a similar screw thread on the inner end of the valve body 1, whereby any rotary movement imparted to said sleeve 9 will cause it to shift longitudinally upon said valve body 1. Formed integral with said sleeve 9 is a spider 10 having a central screw-threaded aperture adapted to receive a screw 11 for attaching to the said spider a valve disk 12, which may be formed of any suitable material. Said valve disk cooperates with the seat formed by the inner end of the body 1 so as to close the same against the flow of water therethrough when the sleeve 9 has been shifted to its extreme movement to the left. In order to prevent leakage, packing rings 13 and 14 are provided between the sleeve 9 and pipe 4, and between said sleeve and the body 1, as shown.

In operation a movement of the handle 6 in one direction will, through the engagement of the cooperating screw threads on sleeve 9 and body 1, cause the valve disk 12 carried by said sleeve to move to the right to the open position shown in Figure 2, while a corresponding movement of said handle in the opposite direction will cause a reverse movement of the sleeve 9, bringing the valve to the closed position shown in Figure 5. The object of the diagonal slot 5 in the pipe 4 is to provide that the handle 6 may be moved in accordance with the longitudinal movement imparted to the sleeve 9 by its screw-threaded engagement with the body 1.

Through my improved construction a very slight movement of the handle 6 will shift the valve from closed to completely open position, and vice versa, and the construction is such that when opened there is a free flow of water through the same, thereby preventing any hammering in the pipes.

Having thus fully described my invention, what I claim as new and desire to secure by Letters Patent, is:—

1. A rotary valve, embodying a valve body, a sleeve on said body and in screw-threaded engagement therewith, a valve carried by said sleeve and movable by the rotation of said sleeve into and out of contact with one end of said valve body to open and close a central passage through said valve body, a pipe engaging said valve body and enclosing said sleeve, and a handle for operating said sleeve projecting through an inclosed slot in said pipe.

2. A rotary valve, embodying a valve body, a sleeve on said body and in screw-threaded engagement therewith, a spider at one end of said sleeve, a valve disk carried by said spider and adapted to engage one end of said valve body to close a central aperture therethrough, a pipe engaging said valve body and enclosing said sleeve, and a handle for operating projecting through an inclosed slot in said pipe.

In testimony whereof I hereunto affix my signature.

WILLIAM B. MILNER.